United States Patent
Hasegawa et al.

(10) Patent No.: US 11,820,434 B2
(45) Date of Patent: Nov. 21, 2023

(54) VEHICLE BODY SIDE STRUCTURE

(71) Applicant: HONDA MOTOR CO., LTD., Tokyo (JP)

(72) Inventors: Atsushi Hasegawa, Wako (JP); Hitomi Yamada, Wako (JP); Ryotaro Takeuchi, Wako (JP); Takayuki Fujii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 17/680,427

(22) Filed: Feb. 25, 2022

(65) Prior Publication Data

US 2022/0315121 A1    Oct. 6, 2022

(30) Foreign Application Priority Data

Mar. 30, 2021    (JP) .................. 2021-057191

(51) Int. Cl.
*B62D 25/04*    (2006.01)
*B62D 21/15*    (2006.01)
*B62D 27/02*    (2006.01)

(52) U.S. Cl.
CPC ............. *B62D 25/04* (2013.01); *B62D 21/15* (2013.01); *B62D 27/023* (2013.01)

(58) Field of Classification Search
CPC ...... B62D 25/04; B62D 25/025; B62D 21/15; B62D 21/157; B62D 27/023

USPC ................... 296/193.06, 209, 29, 30, 187.12
See application file for complete search history.

(56) References Cited

U.S. PATENT DOCUMENTS

| | | | | |
|---|---|---|---|---|
| 6,332,643 B1 * | 12/2001 | Sukegawa | .............. | B62D 25/04 296/193.06 |
| 9,580,110 B2 * | 2/2017 | Imada | .................... | B62D 25/00 |

FOREIGN PATENT DOCUMENTS

JP    2005-199749    7/2005

* cited by examiner

*Primary Examiner* — Dennis H Pedder
(74) *Attorney, Agent, or Firm* — AMIN, TUROCY & WATSON, LLP (57) ABSTRACT

This vehicle body side structure includes: side sills provided at both end portions of a floor section in a width direction of a vehicle and extending in a forward/rearward direction of the vehicle; a pillar extending upward from each of the side sills and having a pillar outer provided on an outside in the width direction of the vehicle; a crushing member provided inward in the width direction of the vehicle with respect to the pillar outer and having a lower portion joined to the side sill and extending above the side sill; and an impactor which is provided above the crushing member, which is joined to an inside of the pillar outer in the width direction of the vehicle, and in which the impactor and the crushing member at least partially overlap in an upward/downward direction.

9 Claims, 7 Drawing Sheets

VEHICLE BODY SIDE STRUCTURE

CROSS-REFERENCE TO RELATED APPLICATION

The present application claims priority based on Japanese Patent Application No. 2021-057191, filed Mar. 30, 2021, the content of which is incorporated herein by reference.

BACKGROUND OF THE INVENTION

Field of the Invention

The present invention relates to a vehicle body side structure.

Description of Related Art

In order to protect the occupants in vehicle interiors in the events of vehicle collisions or the like, various vehicle body side structures capable of absorbing collision loads due to external forces have been proposed. As such vehicle body side structures, for example, there are vehicle body side structures configured to prevent a center pillar from entering a vehicle interior in a collision due to a collision load input from a side of a vehicle.

For example, in Japanese Unexamined Patent Application, First Publication No. 2005-199749, a constitution in which, when a intermediate portion with respect to upper and lower end portions of a pillar is formed into a curved shape in which the intermediate portion is convex outward in a width direction of a vehicle, a side collision input acting in a substantially horizontal direction from the outside toward the inside of a vehicle is converted into an input in an upward/downward direction and sustained is disclosed. In such a constitution, when the pillar is compressed and deforms in the upward/downward direction, the pillar absorbs a collision load input from the side of the vehicle.

Furthermore, this pillar includes upper and lower deformation allowable sections provided at the upper and lower end portions of the pillar and an intermediate deformation allowable section provided at an intermediate portion of the pillar in the upward/downward direction and has a deformation strength of each of the deformation allowable sections set to be smaller than crushing strengths of other portions of the pillar in an axial direction. With such a constitution, at an initial stage of a collision, an attempt is being made to hold the pillar, which deforms inward in the width direction of the vehicle due to a side collision input acting in a substantially horizontal direction from the outside toward the inside of the vehicle, in a shape in a substantially straight line state.

SUMMARY OF THE INVENTION

However, in the constitution disclosed in Japanese Unexamined Patent Application, First Publication No. 2005-199749, the deformation of the pillar to some extent is required until the pillar is compressed and deforms to effectively absorb a collision load. That is to say, it is conceivable that the pillar enter a vehicle interior due to the deformation of the pillar until a collision load is effectively absorbed.

An object of an aspect of the present invention is to provide a vehicle body side structure capable of effectively absorbing a collision load while minimizing deformation of a pillar.

In order to achieve the above object, a vehicle body side structure according to an aspect of the present invention adopts the following constitution.

(1) An aspect of the present invention includes: side sills (for example, side sills 2 in an embodiment) provided at both end portions of a floor section (for example, a floor section 11 in the embodiment) in a width direction of a vehicle and extending in a forward/rearward direction of the vehicle; a pillar (for example, a center pillar 4 in the embodiment) extending upward from each of the side sills and having a pillar outer (for example, a pillar outer 41 in the embodiment) provided on an outside in the width direction of the vehicle; a crushing member (for example, a crushing member 51 in the embodiment) provided inward in the width direction of the vehicle with respect to the pillar outer and having a lower portion joined to the side sill and extending above the side sill; and an impactor (for example, an impactor 52 in the embodiment) which is provided above the crushing member, which is joined to an inside of the pillar outer in the width direction of the vehicle, and in which the impactor and the crushing member at least partially overlap in an upward/downward direction.

According to the aspect of the above (1), when the crushing member whose lower portion is joined to the side sills and the impactor provided above the crushing member and joined to the inside of the pillar outer in the width direction of the vehicle are connected to at least partially overlap in the upward/downward direction, in the case in which a collision load is input from the side of the vehicle, as the pillar deforms, the impactor is displaced to collapse inward and downward in the width direction of the vehicle. Thus, a portion of the crushing member to which the impactor is connected can be pressed inward and downward in the width direction of the vehicle and the crushing member can be actively crushed. In this way, when the crushing member is effectively crushed using the impactor, it is possible to absorb energy due to a collision load input to the pillar. Therefore, it is possible to minimize an amount of deformation of the pillar. As a result, it is possible to effectively absorb a collision load while minimizing the deformation of the pillar.

(2) In an aspect of the above (1), the crushing member may include a lower inclined section (for example, a lower inclined section 51s in the embodiment) inclined upward from an outside toward an inside in the width direction of the vehicle, and a lower end portion of the impactor may include an upper inclined section (for example, an upper inclined section 52s in the embodiment) inclined upward from an outside toward an inside in the width direction of the vehicle and connected to the lower inclined section.

According to the aspect of the above (2), the upper inclined section of the impactor and the lower inclined section of the crushing member are inclined upward from the outside toward the inside in the width direction of the vehicle. For this reason, when a collision load is input from the side of the vehicle, if the crushing member is pressed by the impactor displaced inward in the width direction of the vehicle together with the pillar, a reaction force received by the upper inclined section from the lower inclined section makes it easy for the impactor to deform and collapse inward and downward in the width direction of the vehicle from the upper inclined section as a starting point. Thus, it is possible to efficiently crush the crushing member using the impactor. Therefore, it is possible to efficiently minimize an amount of deformation of the pillar by more effectively absorbing energy due to a collision load input to the pillar.

(3) In an aspect of the above (1), the crushing member may include a lower inner wall (for example, a lower inner wall 51a in the embodiment) disposed at a distance inward in the width direction of the vehicle with respect to the pillar outer, and lower side walls (for example, lower side walls 51b in the embodiment) extending outward in the width direction of the vehicle from both sides of the lower inner wall in the forward/rearward direction of the vehicle and joined to the pillar outer, the impactor may include an upper inner wall (for example, an upper inner wall 52a in the embodiment) disposed at a distance inward in the width direction of the vehicle with respect to the pillar outer, and upper side walls (for example, upper side walls 52b in the embodiment) extending outward in the width direction of the vehicle from both sides of the upper inner wall in the forward/rearward direction of the vehicle and joined to the pillar outers, and an upper portion of the lower inner wall and an upper portion of the lower side wall may be joined to a lower portion of the upper inner wall and a lower portion of the upper side wall in a state in which they overlap.

According to the aspect of the above (3), when the upper portion of the lower inner wall and the upper portion of the lower side wall of the crushing member and the lower portion of the upper inner wall and the lower portion of the upper side wall of the impactor overlap and are joined, a firm closed cross section is formed between the crushing member and the impactor and the pillar outer. Thus, when a collision load is input from the side of the vehicle, if the crushing member is pressed by the impactor displaced inward in the width direction of the vehicle together with the pillar, the upper portion of the crushing member easily deforms to collapse inward and downward in the width direction of the vehicle from the connection portion between the crushing member and the impactor as a starting point. Therefore, the impactor can actively crush the crushing member. As a result, it is possible to efficiently minimize an amount of deformation of the pillar by more effectively absorbing energy due to a collision load input to the pillar.

(4) In an aspect of the above (1), the crushing member may integrally include a lower flange (for example, a lower flange 51f in the embodiment) joined to the side sill, and a side flange (for example, a side flange 51g in the embodiment) joined to the pillar outer below a portion connected to the impactor.

According to the aspect of the above (4), the crushing member includes the lower flange joined to the side sill and the side flange joined to the pillar outer below a portion connected to the impactor. Thus, a firm closed cross section is formed using the crushing member, the side sill, and the pillar outer. Therefore, when a collision load is input from the side of the vehicle, if the crushing member is pressed by the impactor displaced inward in the width direction of the vehicle together with the pillar, the upper portion of the crushing member easily deforms to collapse inward and downward in the width direction of the vehicle while preventing the lower portion of the crushing member from collapsing. Accordingly, it is possible to efficiently minimize an amount of deformation of the pillar by more effectively absorbing energy due to a collision load input to the pillar.

(5) An aspect of the above (4) may further include a connection member (for example, a connection member 55 in the embodiment) provided inside the side sill along a surface of the side sill which intersects the connection member in the forward/rearward direction of the vehicle and configured to connect an inner surface of the side sill and the lower flange of the crushing member.

According to the aspect of the above (5), when the connection member provided inside the side sill is connected to the lower flange of the crushing member, it is possible to firmly support the lower portion of the crushing member by the side sill via the connection member. Thus, in the case in which a collision load is input from the side of the vehicle, when the crushing member is pressed by the impactor displaced inward in the width direction of the vehicle together with the pillar, the upper portion of the crushing member easily deforms to collapse inward and downward in the width direction of the vehicle while preventing the lower portion of the crushing member from collapsing. Therefore, it is possible to efficiently minimize an amount of deformation of the pillar by more effectively absorbing energy due to a collision load input to the pillar.

(6) In an aspect of the above (4), the side sill may have a closed cross-sectional structure extending in the forward/rearward direction of the vehicle, the crushing member may be inserted into the side sill through an opening (for example, an opening 28 in the embodiment) provided in an upper surface of the side sill, the lower flange may be joined to a bottom surface (for example, a bottom surface 21d in the embodiment) of an inner surface of the side sill facing upward, and the side flange may be joined to an inner surface (for example, an inner surface 21s in the embodiment) of inner surfaces of the side sill facing inward in the width direction of the vehicle and an inner surface of the pillar outer in a straddle manner.

According to the aspect of the above (6), when the crushing member is inserted into the side sill through the opening of the side sill and the lower flange and the side flange are joined to the bottom surface of the side sill and the inner surface of the side sill across the pillar outer, it is possible to firmly support the lower portion of the crushing member by the side sill. Thus, when a collision load is input from the side of the vehicle, if the crushing member is pressed by the impactor displaced inward in the width direction of the vehicle together with the pillar, the upper portion of the crushing member easily deforms to collapse inward and downward in the width direction of the vehicle while preventing the lower portion of the crushing member from collapsing. Therefore, it is possible to efficiently minimize an amount of deformation of the pillar by more effectively absorbing energy due to a collision load input to the pillar.

(7) An aspect of the above (1) may further include: a door beam (for example, a front door beam 65 and a rear door beam 75 in the embodiment) provided in a door (for example, a front door 61 and a rear door 71 in the embodiment) openably and closeably provided in a door opening (for example, a front door opening 6 and a rear door opening 7 in the embodiment) formed in at least one in the forward/rearward direction of the vehicle with respect to the pillar and provided to straddle the door opening in the forward/rearward direction of the vehicle with the door opening closed, wherein a beam end (for example, beam ends 65e and 75e in the embodiment) of the door beam in the forward/rearward direction of the vehicle may be disposed at a position in which the beam end and the impactor overlap in the upward/downward direction.

According to the aspect of the above (7), when the impactor and the end portion of the door beam on the pillar side are disposed positions in which the impactor and the end portion overlap in the upward/downward direction, in the case in which a collision load is input from the side of the vehicle, it is possible to efficiently transmit a force transmitted from the door side to the pillar to the impactor.

Therefore, it is possible to actively crush the crushing member using the impactor. Thus, it is possible to efficiently minimize an amount of deformation of the pillar by more effectively absorbing energy due to a collision load input to the pillar.

(8) In an aspect of the above (1), two sets of the impactors and the crushing members may be disposed at intervals in the forward/rearward direction of the vehicle, and a seatbelt winding device (for example, a winding device 100 in the embodiment) may be disposed between the two sets of the impactors and crushing members.

According to the aspect of the above (8), a force input from the door side of the pillar in the forward/rearward direction of the vehicle causes the impactor to crush the crushing member. Thus, it is possible to minimize an influence of a collision load on the winding device disposed between the two sets of the impactors and the crushing members disposed at intervals in the forward/rearward direction of the vehicle.

(9) In the aspect of the above (1), the impactor may have a rigidity higher than that of the crushing member.

According to the aspect of the above (9), when a collision load is input from the side of the vehicle, it is possible to efficiently crush the crushing member using the impactor having high rigidity. Thus, it is possible to efficiently minimize an amount of deformation of the pillar by more effectively absorbing energy due to a collision load input to the pillar.

(10) In the aspect of the above (9), the impactor may be made of a material having a sheet thickness larger than that of the crushing member.

According to the aspect of the above (10), when the impactor is formed of a material having a sheet thickness thicker than that of the crushing member, the impactor has rigidity higher than that of the crushing member. Thus, when a collision load is input from the side of the vehicle, the impactor having high rigidity allows the crushing member to be efficiently crushed. Therefore, it is possible to efficiently an amount of deformation of the pillar by more effectively absorbing energy due to a collision load input to the pillar.

According to an aspect of the present invention, a collision load is effectively absorbed while minimizing the deformation of a pillar.

DESCRIPTION OF EMBODIMENTS

An embodiment of the present invention will be described below with reference to the drawings. In the following description, directions such as a forward direction, a rearward direction, an upward direction, a downward direction, a leftward direction, and a rightward direction are the same as directions when a vehicle travels unless otherwise stated.

Figure 1:
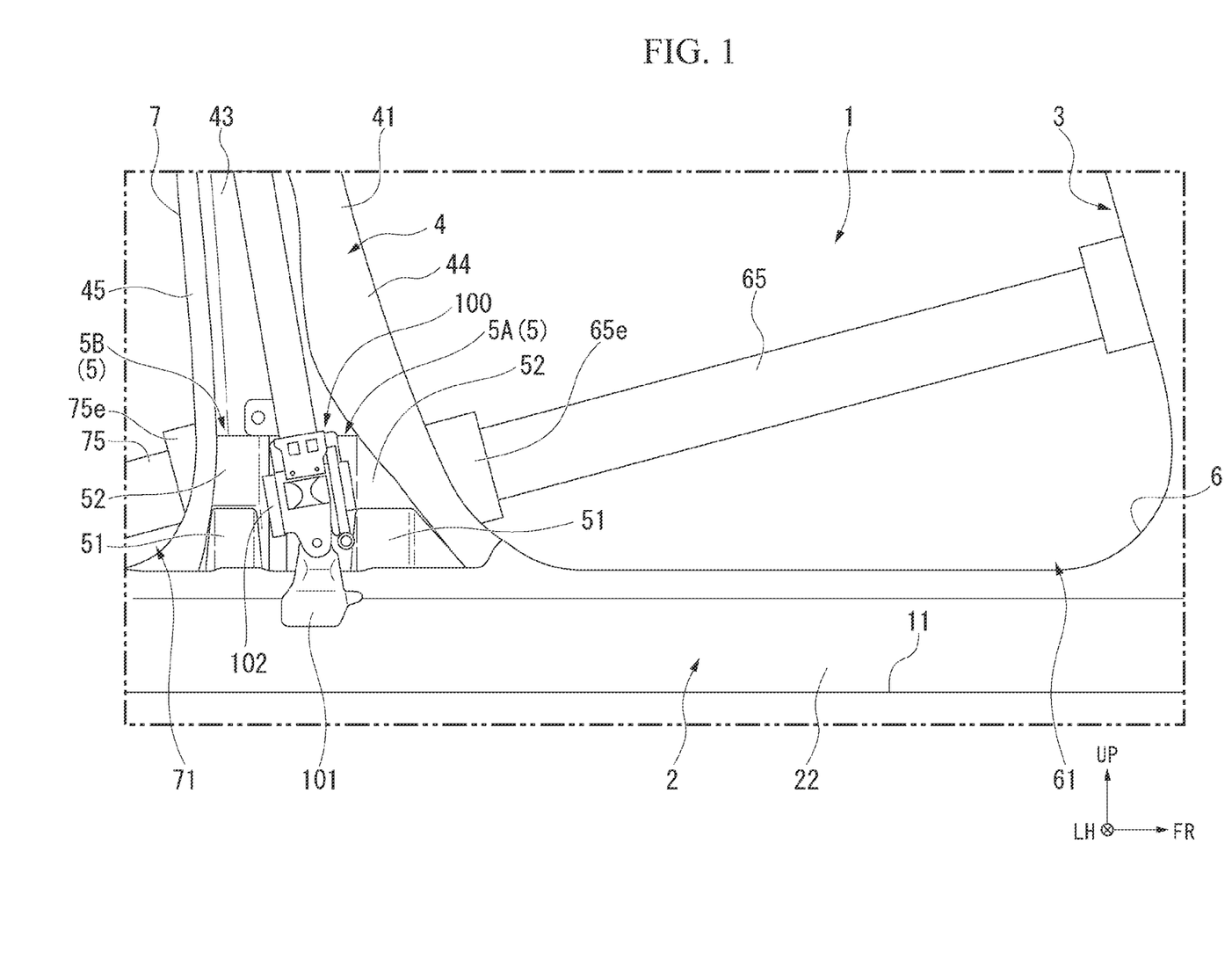
FIG. 1 is a diagram of a vehicle body side structure when viewed from the inside in a width direction of a vehicle.

FIG. 1 is a diagram of a vehicle body side structure 1 when viewed from the inside in a width direction of the vehicle.

As shown in FIG. 1, the vehicle body side structure 1 mainly includes side sills 2, a front pillar 3, center pillars 4, and a crushing section 5.

Figure 2:
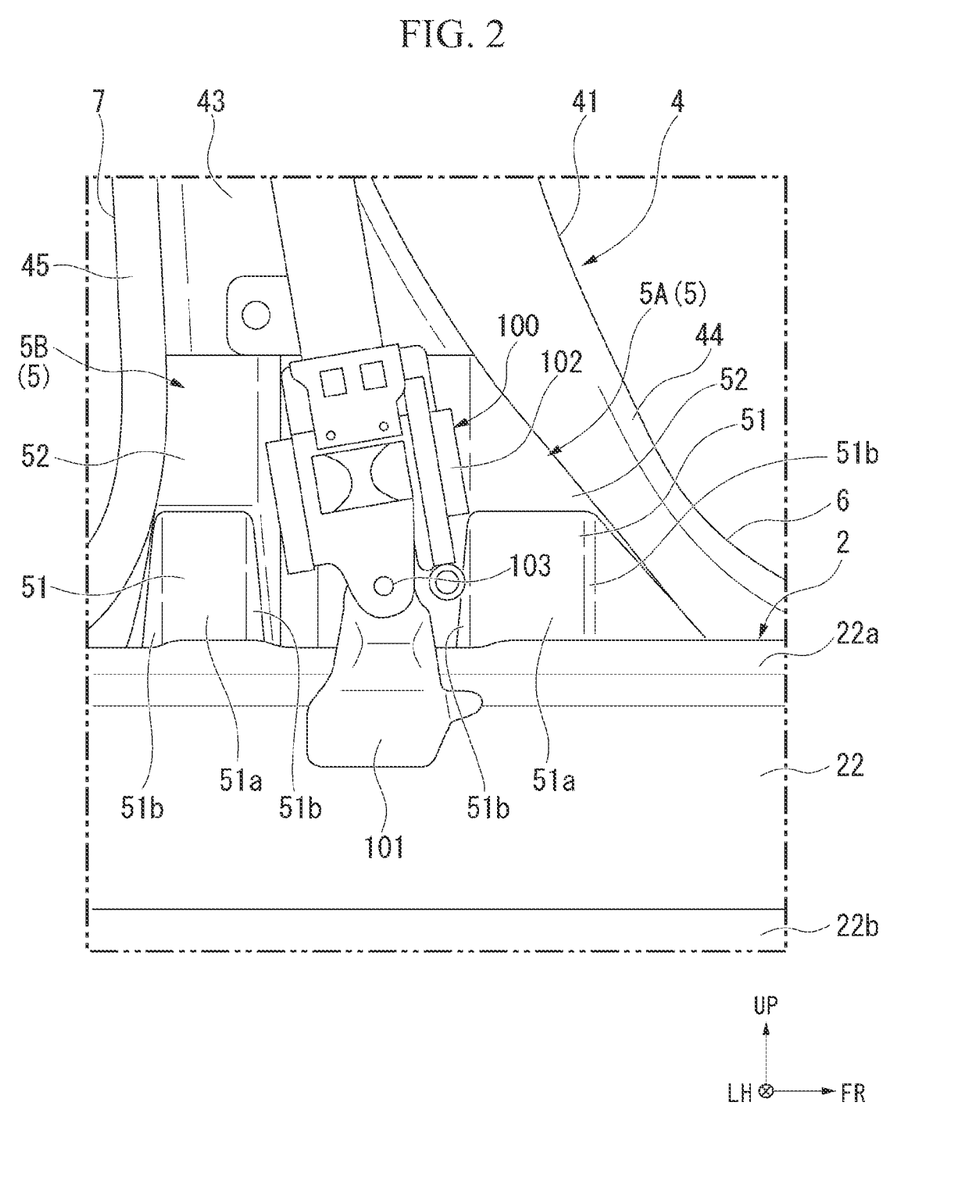
FIG. 2 is an enlarged diagram showing a main part of FIG. 1.
Figure 3:
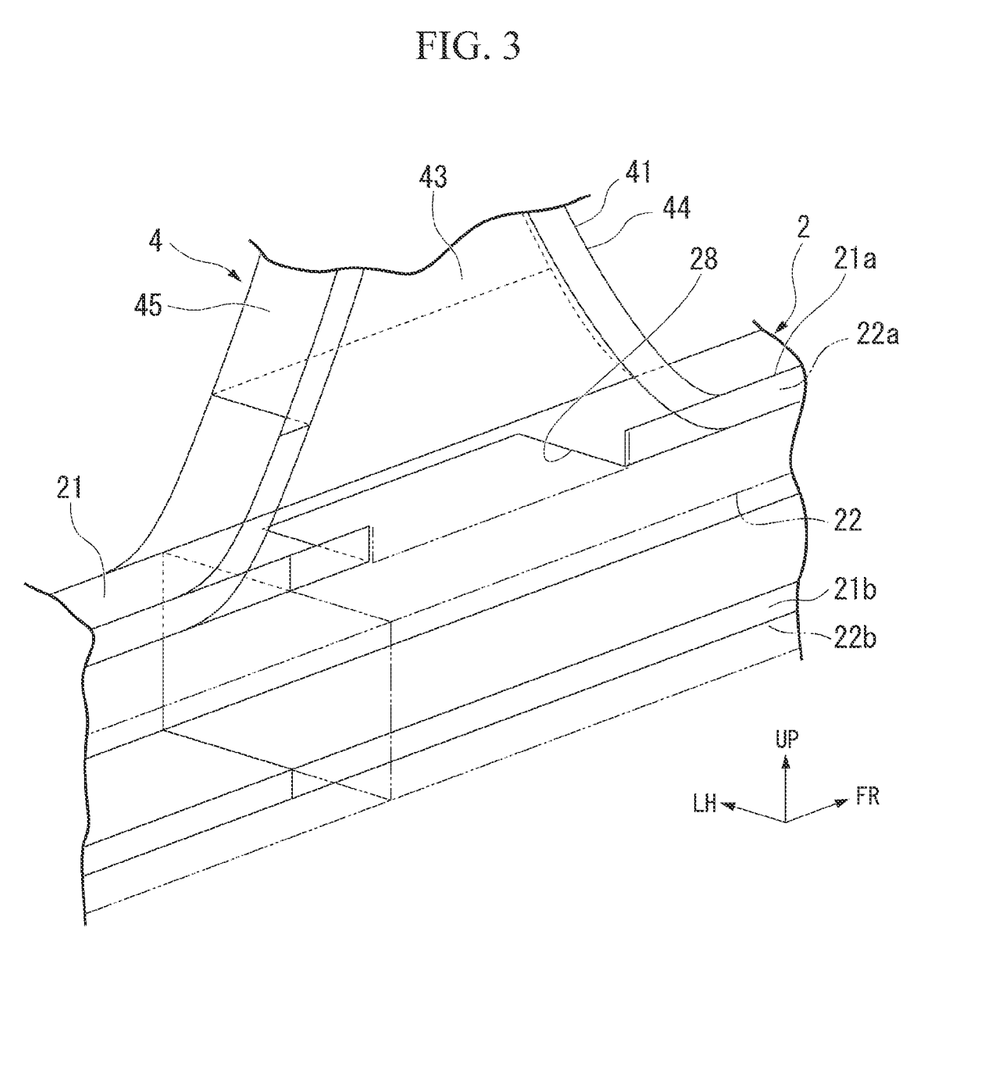
FIG. 3 is a perspective view showing an opening shown in a side sill outer panel of a side sill.
Figure 4:
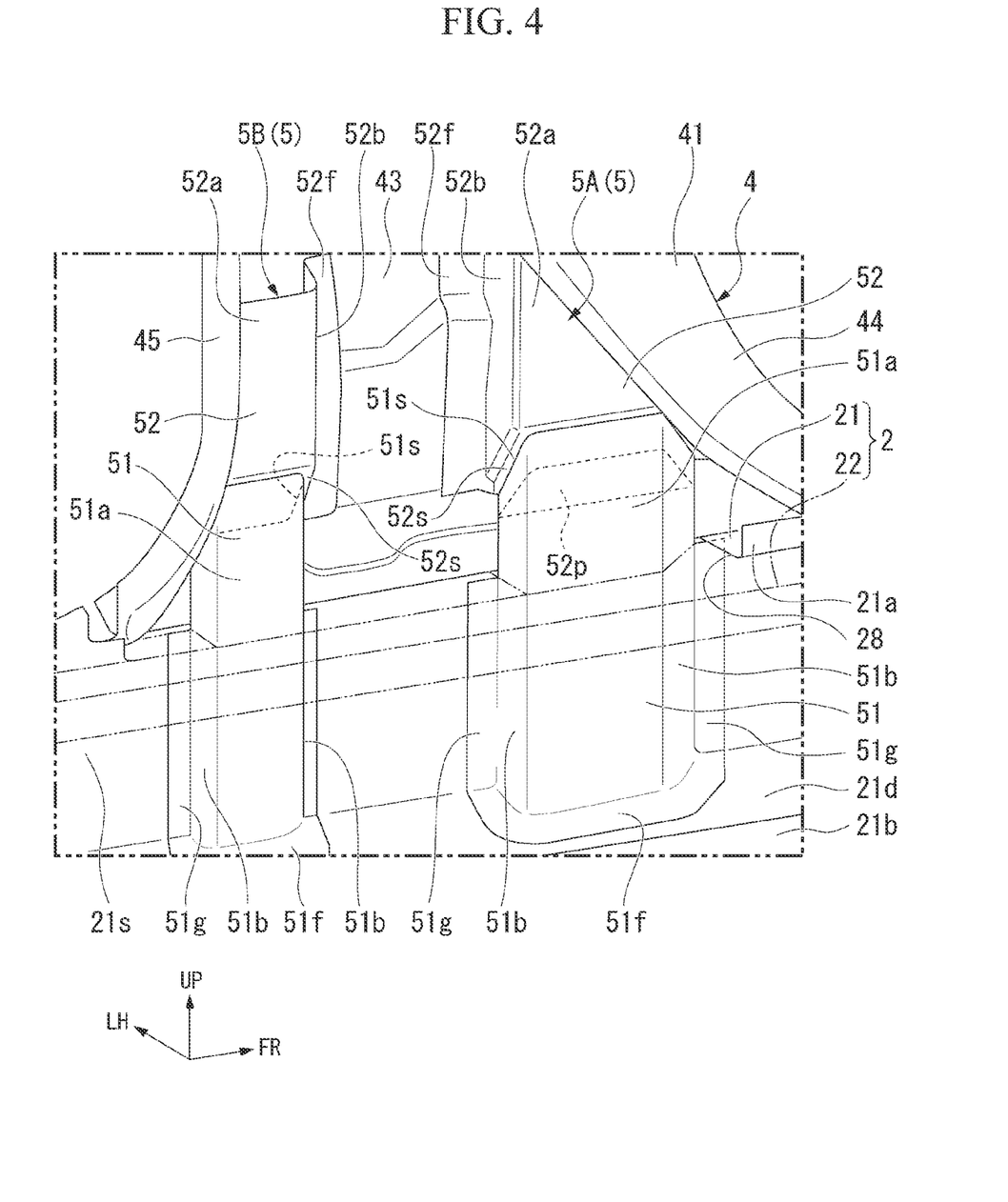
FIG. 4 is a perspective view showing a crushing member and an impactor provided in a vehicle body side structure.

FIG. 2 is an enlarged diagram showing a main part of FIG. 1. FIG. 3 is a perspective view showing an opening shown in a side sill outer panel 21 of each of the side sills 2. FIG. 4 is a perspective view showing a crushing member 51 and an impactor 52 provided in the vehicle body side structure 1.

The side sills 2 are provided at both end portions of a floor section 11 in the width direction of the vehicle of a lower portion of a vehicle body. Each of the side sills 2 has a closed cross-sectional structure extending in a forward/rearward direction of the vehicle. As shown in FIGS. 2 to 4, the side sill 2 includes the side sill outer panel 21 and a side sill inner panel 22. The side sill outer panel 21 is formed to have a hat-shaped cross section in which the side sill outer panel 21 has an upper flange 21*a* and a lower flange 21*b* (refer to FIG. 4). The side sill inner panel 22 is formed to have a hat-shaped cross section in which the side sill inner panel 22 has an upper flange 22*a* and a lower flange 22*b*. In the side sill outer panel 21 and the side sill inner panel 22, the side sills 2 are formed to have a closed cross section by joining the upper flanges 21*a* and 22*a* and the lower flanges 21*b* and 22*b*. The side sill 2 is a highly rigid member which forms a vehicle body skeleton on a side of the lower portion of the vehicle body.

As shown in FIG. 1, the front pillar 3 extends upward from a front end portion of the side sill 2. Each of the center pillars 4 extends upward from a central portion of the side sill 2 in the forward/rearward direction of the vehicle. Furthermore, a quarter pillar (not shown) extends upward from a rear end portion of the side sill 2. A roof side rail (not shown) extending in the forward/rearward direction of the vehicle is fixed to an upper end portion of the front pillar 3, an upper end portion of the center pillar 4, and an upper end portion of the quarter pillar (not shown).

The side sill 2, the front pillar 3, the center pillar 4, the quarter pillar (not shown), the roof side rail (not shown), and the like are covered with a side panel outer (not shown) from the outside in the width direction of the vehicle. The side panel outer is a panel which forms a design surface on an outer side in the width direction of the vehicle.

The center pillar 4 includes a pillar outer 41 and a pillar inner (not shown). The pillar outer 41 is provided on an outer side of the center pillar 4 in the width direction of the vehicle. The pillar outer 41 stands up on the outside in the width direction of the vehicle from a center of the side sill 2 in the forward/rearward direction of the vehicle to the roof side rail (not shown). The pillar outer 41 has an outer side wall 43 disposed on the outside in the width direction of the vehicle, an outer front flange 44 bent inward in the width direction of the vehicle from a front side of the outer side wall 43, and an outer rear flange 45 bent inward in the width direction of the vehicle from a rear side of the outer side wall 43.

The pillar inner (not shown) is provided inside the center pillar 4 in the width direction of the vehicle. The pillar inner (not shown) is provided so that the pillar outer 41 is covered with the pillar inner (not shown) from the inside in the width direction of the vehicle. The outer front flange 44 and the outer rear flange 45 of the pillar outer 41 and an inner front flange (not shown) and an inner rear flange (not shown) of the pillar inner (not shown) are coupled through, for example, spot welding. Thus, the center pillar 4 is formed to have a closed cross section extending in the upward/downward direction.

A front door opening 6 is defined in front of the center pillar 4 to be surrounded by the side sill 2, the front pillar 3, the center pillar 4, and a roof ride rail (not shown). A front door 61 is provided in the front door opening 6 to be openable and closeable. The front door 61 is rotatably connected to the front pillar 3 via a hinge (not shown).

A rear door opening 7 is defined behind the center pillar 4 to be surrounded by the side sill 2, the center pillar 4, the quarter pillar (not shown), and the roof ride rail (not shown). A rear door 71 is provided in the rear door opening 7 to be openable and closeable. The rear door 71 is rotatably connected to the center pillar 4 via the hinge (not shown).

As shown in FIGS. 2 and 4, the crushing section 5 is provided in a cross section of the center pillar 4 (inside the center pillar 4). In the embodiment, the crushing section 5 includes a front crushing section 5A provided on a front side and a rear crushing section 5B provided on a rear side in the center pillar 4. The front crushing section 5A and the rear crushing section 5B each include the crushing member 51 and the impactor 52. In the embodiment, that is to say, two sets of the crushing members 51 and the impactors 52 are provided at intervals in the forward/rearward direction of the vehicle.

Figure 5:
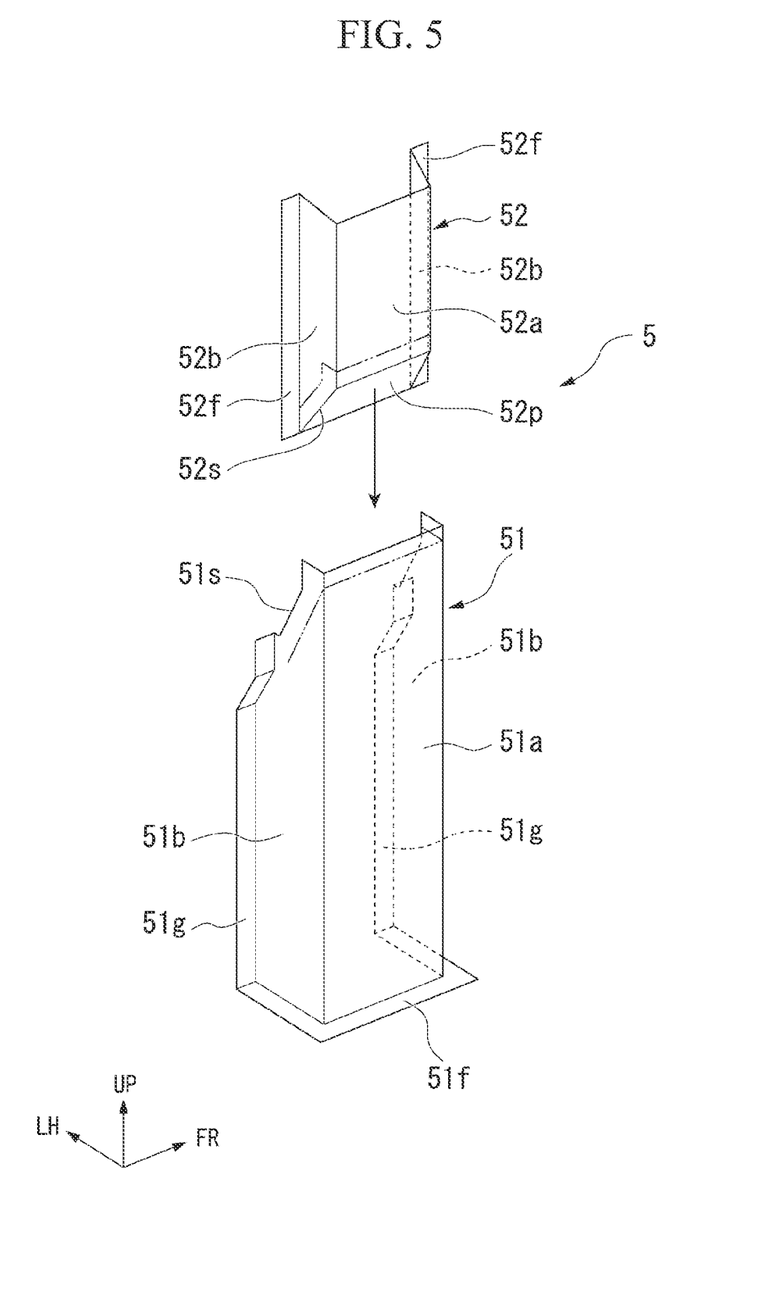
FIG. 5 is a perspective view showing the crushing member and the impactor.

FIG. 5 is a perspective view showing the crushing member 51 and the impactor 52. In FIG. 5, the crushing member 51 and the impactor 52 are shown in a simplified manner so that the front crushing section 5A and the rear crushing section 5B can be collectively described.

As shown in FIGS. 4 and 5, the crushing member 51 is provided inward in the width direction of the vehicle with respect to the pillar outer 41. A lower portion of the crushing member 51 is joined to the side sill 2. An upper portion of the crushing member 51 extends above the side sill 2. The crushing member 51 integrally includes a lower inner wall 51a, a pair of lower side walls 51b, a lower inclined section 51s, a lower flange 51f, and side flanges 51g.

The lower inner wall 51a is disposed at a distance inward in the width direction of the vehicle with respect to the outer side wall 43 of the pillar outer 41. The pair of lower side walls 51b extend outward in the width direction of the vehicle from both sides of the lower inner wall 51a in the forward/rearward direction of the vehicle. Upper ends of the pair of lower side walls 51b are inclined upward from the outside toward the inside in the width direction of the vehicle. Thus, the lower inclined section 51s inclined upward from the outside toward the inside in the width direction of the vehicle is formed on an upper portion of the crushing member 51.

In the embodiment, the lower portion of the crushing member 51 is inserted into the side sill 2 through an opening 28 formed in an upper surface of the side sill 2 (the side sill outer panel 21). The upper portion of the crushing member 51 protrudes upward from the upper surface of the side sill 2. The opening 28 may be formed in at least one of the side sill outer panel 21 and the side sill inner panel 22.

The lower flange 51f extends to spread from a lower end of the crushing member 51 along a bottom surface 21d of inner surfaces of the side sill 2 (the side sill outer panel 21) facing upward. The lower flange 51f is joined to the bottom surface 21d of the side sill 2 through, for example, spot welding.

The side flanges 51g extend in the upward/downward direction along the pillar outer 41 from outer end portions of the pair of lower side walls 51b in the width direction of the vehicle. Each of the side flanges 51g is joined through, for example, spot welding in a state of straddling an inner surface 21s of the inner surfaces of the side sill 2 (the side sill outer panel 21) facing inward in the width direction of the vehicle and an inner surface of the pillar outer 41 (the outer side wall 43) in the upward/downward direction.

In this way, the crushing member 51, a closed cross section extending in the upward/downward direction and opened only upward is formed below the lower inclined section 51s using the lower inner wall 51a, the pair of lower side walls 51b, the pillar outer 41, and the bottom surface 21d of the side sill 2.

The impactor 52 is provided above the crushing member 51. The impactor 52 is joined to an inner surface of the pillar outer 41. The impactor 52 integrally includes an upper inner wall 52a, a pair of upper side walls 52b, an upper inclined section 52s, and upper flanges 52f.

The upper inner wall 52a is disposed at a distance in the forward/rearward direction of the vehicle inward in the width direction of the vehicle with respect to the pillar outer 41. The pair of upper side walls 52b extend outward in the width direction of the vehicle from both end portions of the upper inner wall 52a in the forward/rearward direction of the vehicle. The upper flanges 52f extend in the upward/downward direction along the pillar outer 41 from outer end portions of the pair of upper side walls 52b in the width direction of the vehicle. Each of the upper flanges 52f is joined to the inner surface of the pillar outer 41 through, for example, spot welding. With regard to the front crushing section 5A, an upper flange 52f located on a rear side of the upper flanges 52f is joined to an inner surface of the outer side wall 43 of the pillar outer 41 and an upper flange 52f located on a front side of the upper flanges 52f is joined to the inner surface of the outer front flange 44. Meanwhile, with regard to the rear crushing section 5B, the upper flange 52f located on a front side of the upper flanges 52f is joined to the inner surface of the outer side wall 43 of the pillar outer 41 and the upper flange 52f located on a rear side of the upper flanges 52f is joined to the inner surface of the outer rear flange 45.

Lower ends of the pair of upper side walls 52b are inclined upward from the outside toward the inside in the width direction of the vehicle. Thus, the upper inclined section 52s inclined upward from the outside toward inward in the width direction of the vehicle is formed on a lower portion of the impactor 52. A portion surrounded by the upper inclined section 52s and a lower end of the upper inner wall 52a is closed by an upper inclined sheet 52p. Thus, a lower end of the impactor 52 is closed by the upper inclined sheet 52p to be formed more firmly.

The upper inclined section 52s of the impactor 52 is inserted into the lower inclined section 51s of the crushing member 51. Thus, the impactor 52 and the crushing member 51 at least partially overlap in the upward/downward direction. The upper inclined section 52s and the lower inclined section 51s are joined to each other through, for example, spot welding. To be specific, a lower portion of the lower inner wall 51a and an upper portion of a lower side wall 51b and a lower portion of the upper inner wall 52a and a lower portion of an upper side wall 52b are joined to each other in a state in which they overlap. The crushing member 51 and the impactor 52 may be connected through bolts or the like.

The crushing member 51 and the impactor 52 are formed into a prescribed shape by pressing a metal sheet material.

In the embodiment, a sheet thickness of the meal sheet material forming the impactor 52 is larger than the sheet thickness of the metal sheet material forming the crushing member 51. Thus, the impactor 52 has a strength and rigidity higher than those of the crushing member 51. The impactor 52 may have a strength and rigidity higher than those of the crushing member 51 through a method other than the sheet thickness.

In the embodiment, dimensions of the crushing member 51 and the impactor 52 of the front crushing section 5A in the forward/rearward direction of the vehicle are larger than those of the crushing member 51 and the impactor 52 of the rear crushing section 5B.

As shown in FIG. 2, a seatbelt winding device 100 (so-called emergency locking retractor: ELR) is disposed between the front crushing section 5A and the rear crushing section 5B as described above. The winding device 100 includes an anchor member 101 and a winding device main body 102. The anchor member 101 is attached to the side sill 2 through welding between the front crushing section 5A and the rear crushing section 5B. The winding device main body 102 is attached to the anchor member 101 by the side sill 2 via an anchor pin 103.

Also, as shown in FIG. 1, a front door beam 65 provided to straddle the front door opening 6 in the forward/rearward direction of the vehicle is provided in the front door 61 provided in the front door opening 6 formed in front of the center pillar 4 to be openable and closeable. The front door beam 65 is provided to straddle the front door opening 6 in a state in which the front door 61 closes the front door opening 6. In front of the center pillar 4, a beam end 65e of the front door beam 65 is disposed at a position in which the beam end 65e and the impactor 52 overlap in the upward/downward direction.

Also behind the center pillar 4, a beam end 75e of a rear door beam 75 provided to straddle the rear door opening 7 is disposed at a position in which the beam end 75e and the impactor 52 overlap in the upward/downward direction. The beam ends 65e and 75e and the impactor 52 may at least partially overlap in the upward/downward direction.

Figure 6:
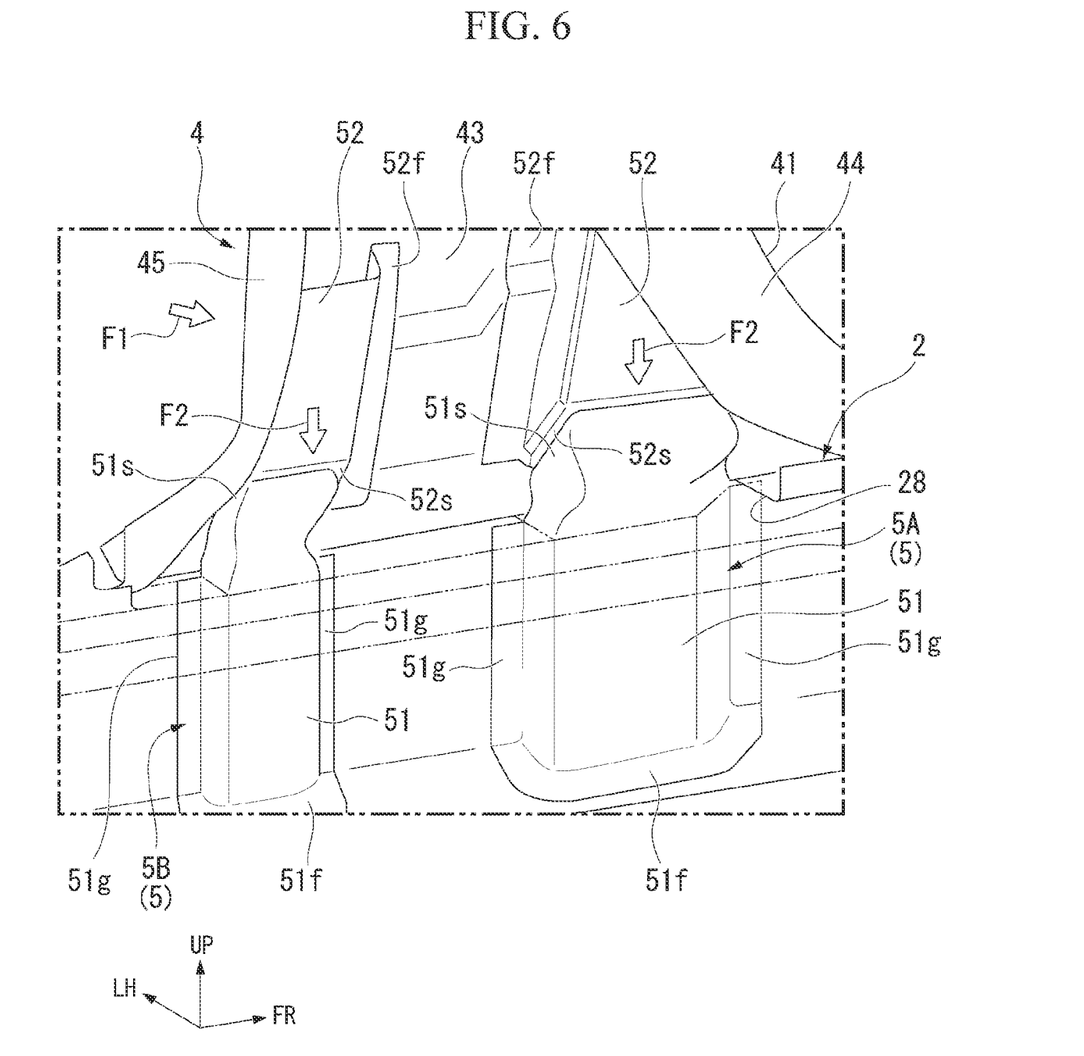
FIG. 6 is a perspective view showing a state in which the crushing member deforms due to an impact load from a side of a vehicle body.

FIG. 6 is a perspective view showing a state in which the crushing member 51 deforms using an impact load from the side of the vehicle body.

As shown in FIG. 6, in the crushing section 5 as described above, when a force F1 due to a collision load is input from the side of the vehicle, the center pillar 4 deforms to be pushed inward in the width direction of the vehicle. Thus, as the center pillar 4 deforms, the entire impactor 52 collapses inward and downward in the width direction of the vehicle. Thus, a force F2 which presses the lower inclined section 51s downward from the upper inclined section 52s of the impactor 52 acts. Through this force F2, a portion of the crushing member 51 to which the impactor 52 is connected is pressed inward and downward in the width direction of the vehicle and the upper portion of the crushing member 51 is crushed. In this way, when the crushing member 51 is effectively crushed using the impactor 52, energy due to a collision load input to the center pillar 4 is absorbed.

In this way, in the embodiment, the vehicle body side structure 1 is constituted to include the side sills 2 provided at both end portions of the floor section 11 in the width direction of the vehicle and extending in the forward/rearward direction of the vehicle, the center pillar 4 extending upward from each of the side sills 2 and having the pillar outer 41 provided outward in the width direction of the vehicle, the crushing member 51 provided inward in the width direction of the vehicle with respect to the pillar outer 41 and having the lower portion joined to the side sill 2 and extending above the side sill 2, and the impactor 52 provided above the crushing member 51, joined to the inside of the pillar outer 41 in the width direction of the vehicle, and configured so that the impactor 52 and the crushing member 51 at least partially overlap in the upward/downward direction.

According to this constitution, when a collision load is input from the side of the vehicle, the impactor 52 collapses inward and downward in the width direction of the vehicle with the deformation of the center pillar 4. Thus, a portion of the crushing member 51 to which the impactor 52 is connected is pressed inward and downward in the width direction of the vehicle and it is possible to actively crush the crushing member 51. When the crushing member 51 is effectively crushed using the impactor 52 in this way, it is possible to absorb energy due to a collision load input to the center pillar 4. Therefore, it is possible to minimize an amount of deformation of the center pillar 4. As a result, it is possible to effectively absorb a collision load while minimizing the deformation of the center pillar 4.

In the embodiment, the crushing member 51 is constituted to include the lower inclined section 51s inclined upward from the outside toward the inside in the width direction of the vehicle and the lower end portion of the impactor 52 is constituted to include the upper inclined section 52s inclined upward from the outside toward the inside in the width direction of the vehicle and connected to the lower inclined section 51s.

According to this constitution, the upper inclined section 52s of the impactor 52 and the lower inclined section 51s of the crushing member 51 are inclined upward from the outside toward the inside in the width direction of the vehicle. For this reason, when a collision load is input from the side of the vehicle, if the crushing member 51 is pressed by the impactor 52 displaced inward in the width direction of the vehicle together with the pillar 4, the impactor 52 easily deforms to easily collapse inward and downward in the width direction of the vehicle from the upper inclined section 52s as a starting point due to a reaction force received by the upper inclined section 52s from the lower inclined section 51s. Thus, it is possible to efficiently crush the crushing member 51 using the impactor 52. Therefore, it is possible to efficiently minimize an amount of deformation of the center pillar 4 by more effectively absorbing energy due to a collision load input to the center pillar 4.

In the embodiment, the crushing member 51 is constituted to include the lower inner wall 51a disposed at a distance inward in the width direction of the vehicle with respect of the pillar outer 41 and the lower side walls 51b extending outward in the width direction of the vehicle from both sides of the lower inner wall 51a in the forward/rearward direction of the vehicle joined to the pillar outer 41, the impactor 52 is constituted to include the upper inner wall 52a disposed at a distance inward in the width direction of the vehicle with respect to the pillar outer 41 and the upper side walls 52b extending outward in the width direction of the vehicle from both sides of the upper inner wall 52a in the forward/rearward direction of the vehicle and joined to the pillar outer 41, and the upper portion of the lower inner wall 51a and the upper portion of the lower side wall 51b and the lower portion of the upper inner wall 52a and the lower portion of the upper side wall 52b are constituted to be joined to each other in a state in which they overlap.

According to this constitution, when the upper portion of the lower inner wall 51a and the upper portion of the lower side wall 51b of the crushing member 51 and the lower portion of the upper inner wall 52a and the lower portion of the upper side wall 52b of the impactor 52 are joined to each other in a state in which they overlap, a firm closed cross section is formed between the crushing member 51 and the impactor 52 and the pillar outer 41. Thus, when a collision load is input from the side of the vehicle, the impactor 52 easily deforms to collapse inward and downward in the width direction of the vehicle using a connection portion between the crushing member 51 and the impactor 52 as a starting point. Therefore, it is possible to actively crush the crushing member 51 using the impactor 52. As a result, it is possible to efficiently minimize an amount of deformation of the center pillar 4 by more effectively absorbing energy due to a collision load input to the center pillar 4.

In the embodiment, the crushing member 51 is constituted to integrally include the lower flange 51f joined to the side sill 2 and the side flange 51g joined to the pillar outer 41 below a portion connected to the impactor 52.

According to this constitution, a firm closed cross section is formed by the crushing member 51 and the side sills 2 and the pillar outer 41. Thus, it is possible to prevent the lower portion of the crushing member 51 from collapsing and the upper portion of the crushing member 51 easily deforms to collapse inward and downward in the width direction of the vehicle using a connection portion between the crushing member 51 and the impactor 52 as a starting point. Therefore, it is possible to efficiently minimize an amount of deformation of the center pillar 4 by more effectively absorbing energy due to a collision load input to the center pillar 4.

In the embodiment, the crushing member 51 is constituted to be inserted into the side sill 2 through the opening 28 provided in the upper surface of the side sill 2, the lower flange 51f is constituted to be joined to the bottom surface 21d of the side sill 2, and the side flange 51g is constituted to be joined to the inner surface 21s of the side sill 2 and the pillar outer 41 in a straddle manner.

According to this constitution, it is possible to firmly support the lower portion of the crushing member 51 by the side sill 2. Thus, when a collision load is input from the side of the vehicle, it is possible to prevent the lower portion of the crushing member 51 from collapsing and the upper portion of the crushing member 51 easily deforms to collapse inward and downward in the width direction of the vehicle. Therefore, it is possible to efficiently minimize an amount of deformation of the center pillar 4 by more effectively absorbing energy due to a collision load input to the center pillar 4.

In the embodiment, the front door beam 65 and the rear door beam 75 provided in the front door 61 and the rear door 71 provided openably and closeably in the front door opening 6 and the rear door opening 7 formed in at least one in the forward/rearward direction of the vehicle with respect to the center pillar 4 to straddle the front door 61 and the rear door 71 in the forward/rearward direction of the vehicle with the front door opening 6 and the rear door opening 7 closed are configured to be further provided and the beam ends 65e and 75e of the front door beam 65 and the rear door beam 75 in the forward/rearward direction of the vehicle are constituted to be disposed at positions in which the beam ends 65e and 75e and the impactor 52 overlap in the upward/downward direction.

According to this constitution, when the impactor 52 and the end portions of the front door beam 65 and the rear door beam 75 on the center pillar 4 are disposed at positions in which the impactor 52 and the end portions and overlap in the upward/downward direction, in the case in which a collision load is input from the side of the vehicle, it is possible to efficiently transmit forces transmitted from the front door 61 and the rear door 71 side to the center pillar 4 to the impactor 52. Therefore, it is possible to actively crush the crushing member 51 using the impactor 52. Thus, it is possible to efficiently minimize an amount of deformation of the center pillar 4 by more effectively absorbing energy due to a collision load input to the center pillar 4.

In the embodiment, the two sets of the impactors 52 and the crushing members 51 are constituted to be disposed at intervals in the forward/rearward direction of the vehicle and the seatbelt winding device 100 is constituted to be disposed between the two sets of the impactors 52 and the crushing members 51.

According to this constitution, the crushing member 51 is crushed using the impactor 52 by the forces input from the front door 61 and the rear door 71 side of the center pillar 4 in the forward/rearward direction of the vehicle. Thus, it is possible to minimize an influence of a collision load on the winding device 100 disposed between the two sets of the impactors 52 and the crushing members 51 disposed at intervals in the forward/rearward direction of the vehicle.

In the embodiment, the impactor 52 is constituted to have a rigidity higher than that of the crushing member 51.

According to this constitution, when a collision load is input from the side of the vehicle, it is possible to efficiently crush the crushing member 51 using the impactor 52 having a high rigidity. Thus, it is possible to efficiently minimize an amount of deformation of the center pillar 4 by more effectively absorbing energy due to a collision load input to the center pillar 4.

In the embodiment, the impactor 52 is constituted to be made of a material having a sheet thickness larger than that of the crushing member 51.

According to this constitution, when the impactor 52 is made of a material having a sheet thickness larger than that of the crushing member 51, the impactor 52 has a rigidity higher than that of the crushing member 51. Thus, when a collision load is input from the side of the vehicle, it is possible to efficiently crush the crushing member 51 using the impactor 52 having a high rigidity. Therefore, it is possible to efficiently minimize an amount of deformation of the center pillar 4 by more effectively absorbing energy due to a collision load input to the center pillar 4.

Modified Example of Embodiment

In the vehicle body side structure 1 having the constitution as described above, as shown in FIG. 7, a connection member 55 may be further provided inside the side sill 2. The connection member 55 has a box shape or a sheet shape in which the connection member 55 is provided along a surface of the side sill 2 which intersects the connection member 55 in the forward/rearward direction of the vehicle. An inner end portion of the connection member 55 in the width direction of the vehicle is joined to the inner surface of the side sill 2 (the side sill inner panel 22) through spot welding or the like. An outer end portion of the connection member 55 in the width direction of the vehicle is joined to the lower flange 51f of the crushing member 51 through spot welding or the like. The connection member 55 may be constituted to be joined to the lower inner wall 51a of the crushing member 51.

Figure 7:
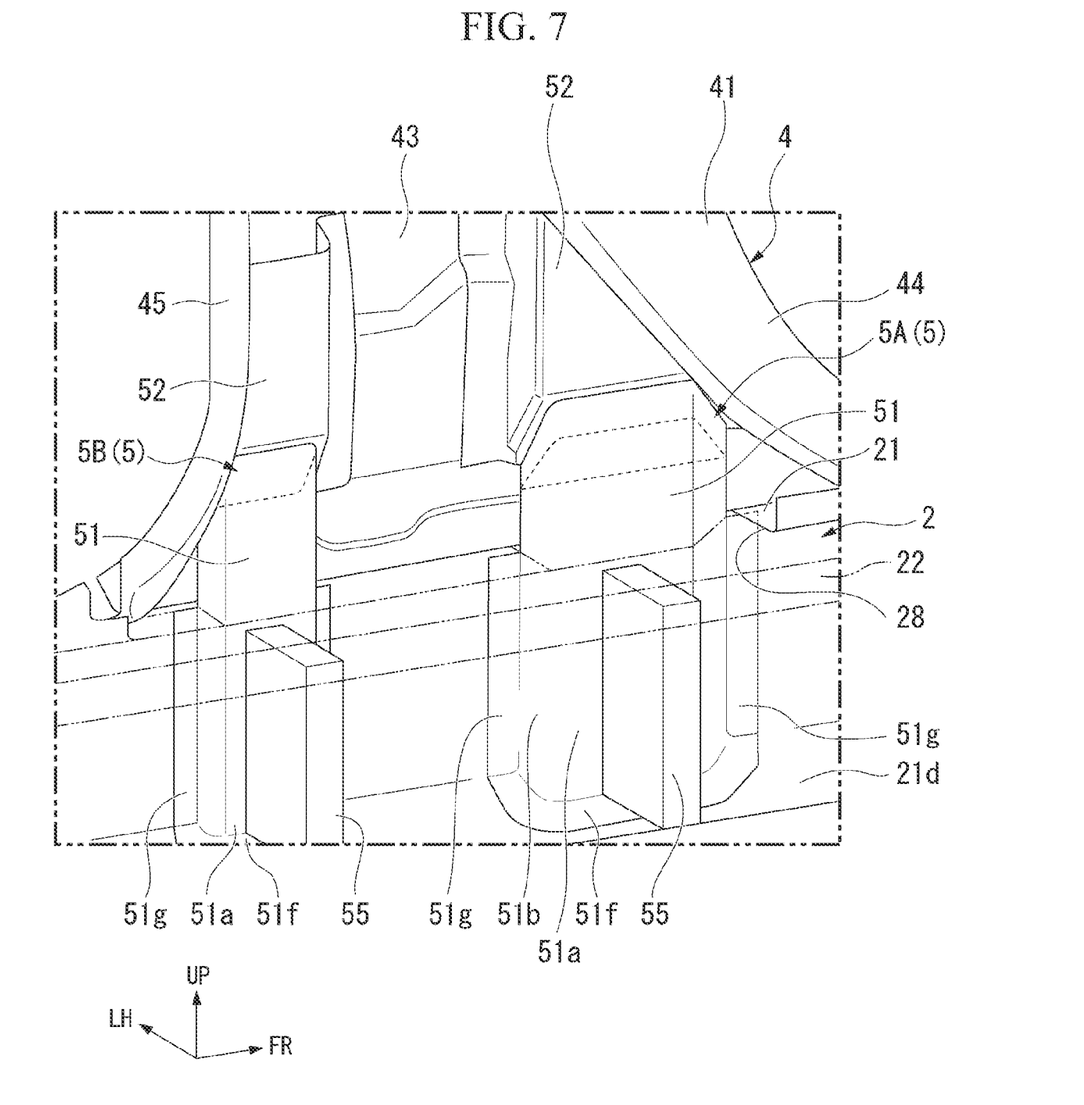
FIG. 7 is a perspective view showing a modified example of the vehicle body side structure.

According to this constitution, when the connection member 55 provided inside the side sill 2 is connected to the lower flange 51f of the crushing member 51, the lower portion of the crushing member 51 is firmly supported by the side sill 2 via the connection member 55. Thus, when a collision load is input from the side of the vehicle, it is possible to prevent the lower portion of the crushing member 51 from collapsing and the upper portion of the crushing member 51 easily collapses inward and downward in the width direction of the vehicle due to the displacement of the impactor 52. Therefore, it is possible to efficiently minimize an amount of deformation of the center pillar 4 by more effectively absorbing energy due to a collision load input to the center pillar 4.

Other Modified Examples

Although the preferred embodiments according to the present invention have been described above, the present invention is not limited to these examples. Additions, omissions, replacements, and other changes of the constitution are possible without departing from the gist of the present invention. The present invention is not limited by the description described above and is limited only by the accompanying claims.

For example, although the lower portion of the crushing member 51 is inserted into the side sill 2 through the opening 28 formed in the upper surface of the side sill 2 in the embodiment described above, the present invention is not limited to this constitution. The lower portion of the crushing member 51 may be joined to, for example, the upper surface of the side sill 2.

Also, although the lower portion of the impactor 52 is inserted into the crushing member 51 in the embodiment described above, the present invention is not limited to this constitution. For example, the lower side wall 51b and a part of the upper side wall 52b may overlap to be connected in the upward/downward direction. Furthermore, the upper inclined sheet 52p of the impactor 52 may be brought into contact with the upper portion (the lower inclined section 51s or the like) of the crushing member 51.

In addition, although the two sets of the crushing members 51 and the impactors 52 are provided at intervals in the forward/rearward direction of the vehicle body in the embodiment described above, the present invention is not limited to this constitution. Only one set of the crushing members 51 and the impactors 52 or three or more sets of the crushing members 51 and the impactors 52 may be provided.

Also, although the crushing member 51 and the impactor 52 are provided on the center pillar 4 in the embodiment described above, the present invention is not limited to the center pillar 4 and the crushing member 51 and the impactor 52 may be provided on the front pillar 3 or the quarter pillar (not shown).

In addition, it is possible to replace the constituent elements in the embodiment described above with well-known constituent elements as appropriate without departing from the spirit of the present invention and the modified examples described above may be appropriately combined.

What is claimed is:

1. A vehicle body side structure, comprising:
   side sills provided at both end portions of a floor section in a width direction of a vehicle and extending in a forward/rearward direction of the vehicle;
   a pillar extending upward from each of the side sills and having a pillar outer provided on an outside in the width direction of the vehicle;
   a crushing member provided inward in the width direction of the vehicle with respect to the pillar outer and having a lower portion joined to the side sill and extending above the side sill; and
   an impactor which is provided above the crushing member, which is joined to an inside of the pillar outer in the width direction of the vehicle, and in which the impactor and the crushing member at least partially overlap in an upward/downward direction,
   wherein the crushing member includes a lower inclined section inclined upward from an outside toward an inside in the width direction of the vehicle, and
   wherein a lower end portion of the impactor includes an upper inclined section inclined upward from an outside toward an inside in the width direction of the vehicle and connected to the lower inclined section.

2. The vehicle body side structure according to claim 1, wherein the crushing member includes a lower inner wall disposed at a distance inward in the width direction of the vehicle with respect to the pillar outer, and
   lower side walls extending outward in the width direction of the vehicle from both sides of the lower inner wall in the forward/rearward direction of the vehicle and joined to the pillar outer,
   the impactor includes an upper inner wall disposed at a distance inward in the width direction of the vehicle with respect to the pillar outer, and
   upper side walls extending outward in the width direction of the vehicle from both sides of the upper inner wall in the forward/rearward direction of the vehicle and joined to the pillar outers, and
   an upper portion of the lower inner wall and an upper portion of the lower side wall are joined to a lower portion of the upper inner wall and a lower portion of the upper side wall in a state in which they overlap.

3. The vehicle body side structure according to claim 1, wherein the crushing member integrally includes:
   a lower flange joined to the side sill; and
   a side flange joined to the pillar outer below a portion connected to the impactor.

4. The vehicle body side structure according to claim 3, further comprising:
   a connection member provided inside the side sill along a surface of the side sill which intersects the connection member in the forward/rearward direction of the vehicle and configured to connect an inner surface of the side sill and the lower flange of the crushing member.

5. The vehicle body side structure according to claim 3, wherein the side sill has a closed cross-sectional structure extending in the forward/rearward direction of the vehicle,
   the crushing member is inserted into the side sill through an opening provided in an upper surface of the side sill,
   the lower flange is joined to a bottom surface of an inner surface of the side sill facing upward, and
   the side flange is joined to an inner surface of inner surfaces of the side sill facing inward in the width direction of the vehicle and an inner surface of the pillar outer in a straddle manner.

6. The vehicle body side structure according to claim 1, further comprising:
   a door beam provided in a door openably and closeably provided in a door opening formed in at least one in the forward/rearward direction of the vehicle with respect to the pillar and provided to straddle the door opening in the forward/rearward direction of the vehicle with the door opening closed,
   wherein a beam end of the door beam in the forward/rearward direction of the vehicle is disposed at a position in which the beam end and the impactor overlap in the upward/downward direction.

7. A vehicle body side structure, comprising:
- side sills provided at both end portions of a floor section in a width direction of a vehicle and extending in a forward/rearward direction of the vehicle;
- a pillar extending upward from each of the side sills and having a pillar outer provided on an outside in the width direction of the vehicle;
- a crushing member provided inward in the width direction of the vehicle with respect to the pillar outer and having a lower portion joined to the side sill and extending above the side sill; and
- an impactor which is provided above the crushing member, which is joined to an inside of the pillar outer in the width direction of the vehicle, and in which the impactor and the crushing member at least partially overlap in an upward/downward direction,
- wherein two sets of the impactors and the crushing members are disposed at intervals in the forward/rearward direction of the vehicle, and
- wherein a seatbelt winding device is disposed between the two sets of the impactors and crushing members.

8. The vehicle body side structure according to claim 1, wherein the impactor has a rigidity higher than that of the crushing member.

9. The vehicle body side structure according to claim 8, wherein the impactor is made of a material having a sheet thickness larger than that of the crushing member.

* * * * *